United States Patent
Hoover

(10) Patent No.: US 9,108,727 B2
(45) Date of Patent: Aug. 18, 2015

(54) BLADE FOLD SYSTEM MONITORING

(75) Inventor: Eric D. Hoover, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 866 days.

(21) Appl. No.: 13/086,003

(22) Filed: Apr. 13, 2011

(65) Prior Publication Data

US 2012/0121412 A1 May 17, 2012

Related U.S. Application Data

(60) Provisional application No. 61/355,345, filed on Jun. 16, 2010.

(51) Int. Cl.
*B64C 27/50* (2006.01)

(52) U.S. Cl.
CPC ........................................ *B64C 27/50* (2013.01)

(58) Field of Classification Search
USPC .................. 416/142, 143, 246, 205
See application file for complete search history.

(56) References Cited

U.S. PATENT DOCUMENTS

| | | | |
|---|---|---|---|
| 3,101,785 A | 8/1963 | Leoni | |
| 3,802,798 A | 4/1974 | Hibyan | |
| 4,028,001 A | 6/1977 | Watson | |
| 4,284,387 A | 8/1981 | Ferris | |
| 4,376,979 A * | 3/1983 | Fowler et al. | ...................... 701/3 |
| 4,436,483 A | 3/1984 | Watson | |
| 5,031,858 A * | 7/1991 | Schellhase et al. | ........... 244/7 R |
| 5,782,606 A | 7/1998 | Mondet et al. | |
| 6,047,924 A | 4/2000 | Thomassin et al. | |
| 6,213,712 B1 | 4/2001 | Muylaert | |
| 6,695,253 B1 | 2/2004 | Romani et al. | |
| 6,783,327 B1 * | 8/2004 | Davis | ................................ 416/1 |
| 7,530,790 B2 | 5/2009 | Cabrera et al. | |
| 7,798,442 B2 | 9/2010 | Miner et al. | |
| 2006/0067822 A1 | 3/2006 | D'Anna | |
| 2006/0120873 A1 * | 6/2006 | D'Anna | ........................ 416/221 |

OTHER PUBLICATIONS

European Search Report for Application No. 11162704.8-1754/2397408, Mailed Nov. 13, 2013. 6 pages.

* cited by examiner

*Primary Examiner* — Dwayne J White
*Assistant Examiner* — Justin Seabe
(74) *Attorney, Agent, or Firm* — Cantor Colburn LLP

(57) ABSTRACT

A rotor blade fold system for an aircraft includes one or more actuators operably connected to one or more blade components of one or more rotor blades of the aircraft. One or more sensors are located at the one or more rotor blades and are configured to sense operation of the one or more blade components. A fold control system is configured to monitor output from the one or more sensors and is capable of stopping operation of the blade fold system, via communication with the one or more actuators, if the one or more blade components are not operating within predetermined limits.

19 Claims, 5 Drawing Sheets

BLADE FOLD SYSTEM MONITORING

FEDERAL RESEARCH STATEMENT

This invention was made with Government support under N00019-06-C-0081 awarded by the Department of the Navy. The Government has certain rights in this invention.

CROSS REFERENCE TO RELATED APPLICATIONS

This application is a nonprovisional application of U.S. Provisional Patent Application No. 61/355,345 filed Jun. 16, 2010, the entire contents of which are incorporated herein by reference.

BACKGROUND OF THE INVENTION

The subject matter disclosed herein relates to blade fold systems for aircraft.

Rotor-driven aircraft, for example, helicopters, utilize blade folding systems which fold the blades of a main rotor to reduce the space required for parking and/or storing the aircraft. Such systems are typically activated by an operator and visually monitored. Upon activation, each blade is to individually articulate from a spread position to a folded position. In a blade fold or blade spread, a number of events must happen in the proper sequence, for each blade and also among the blades. During operation, however, any number of faults in the system may prevent the blade folding sequence from occurring as required, and thus operates in an undesired sequence. At such times, it is desired to stop the blade folding sequence before a collision between the blades occurs to prevent costly damage to the blades. Detecting these faults, however, requires human observation and is therefore prone to human error and inattention, and further may be acting at a speed not easily perceptible by humans (either too fast or too slow).

BRIEF DESCRIPTION OF THE INVENTION

According to one aspect of the invention, a rotor blade fold system for an aircraft includes one or more actuators operably connected to one or more blade components of one or more rotor blades of the aircraft. One or more sensors are located at the one or more rotor blades and are configured to sense operation of the one or more blade components. A fold control system is configured to monitor output from the one or more sensors and is capable of stopping operation of the blade fold system, via communication with the one or more actuators, if the one or more blade components are not operating within predetermined limits.

According to another aspect of the invention, a method of folding one or more rotor blades of an aircraft includes activating one or more actuators operably connected to the one or more rotor blades. The one or more blades are urged toward a folded position via activation of the one or more actuators, and one or more blade components of the one or more rotor blades are monitored via one or more sensors disposed at the one or more rotor blades. A determination is made if the one or more blade components are operating within a predetermined limit, and operation of the blade fold system is stopped if the one or more blade components are not operating within the predetermined limit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
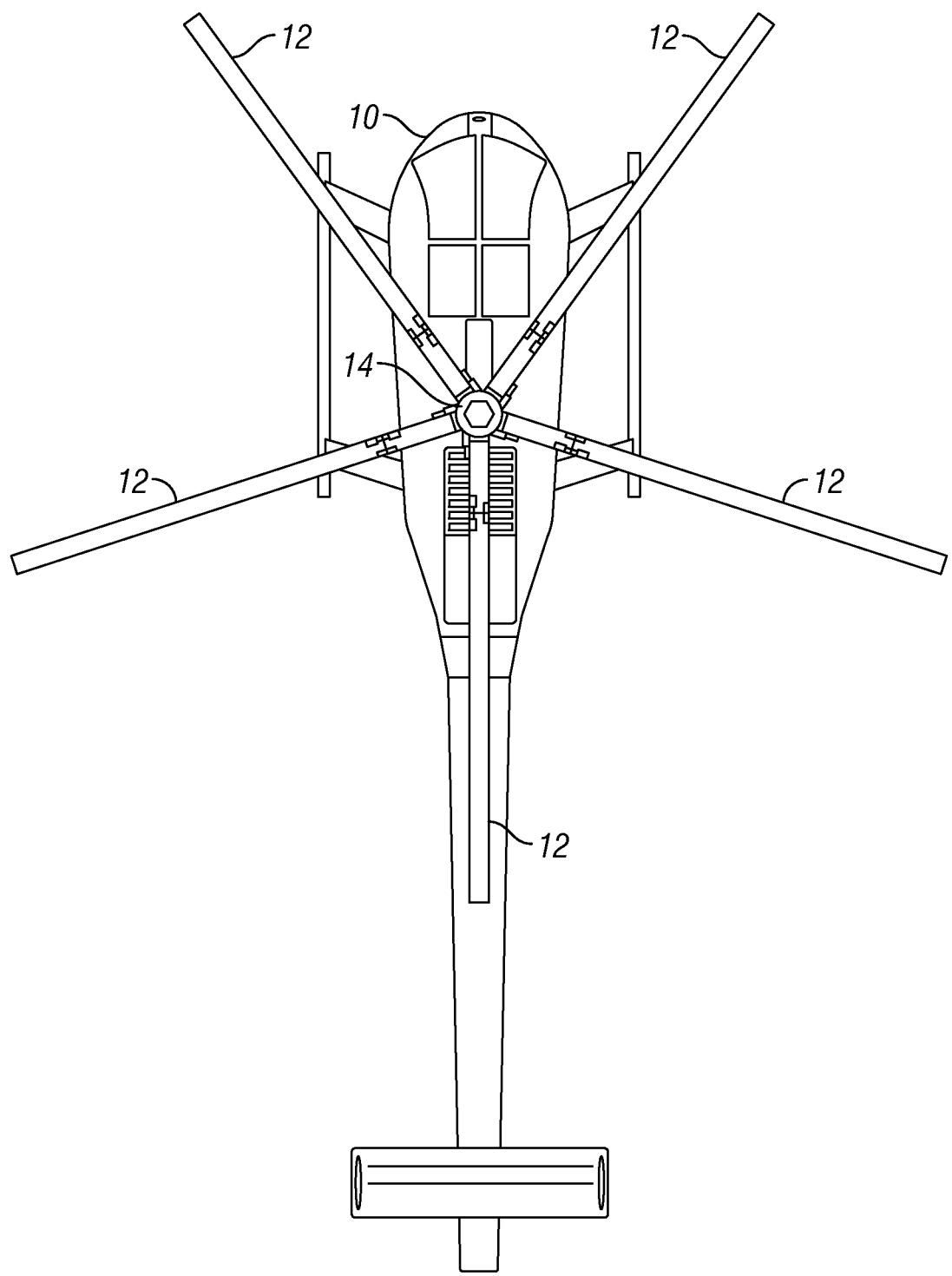
FIG. 1 is a plan view of a rotor for an aircraft in an extended configuration.
Figure 2:
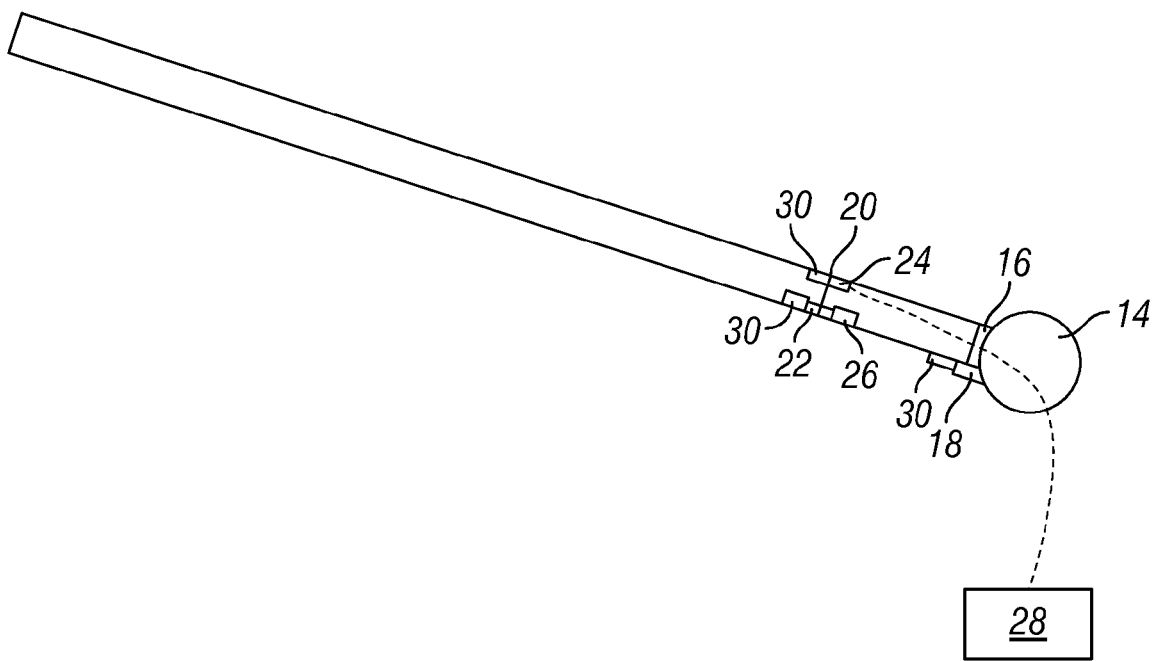
FIG. 2 is a schematic view of a single rotor blade.
Figure 3:
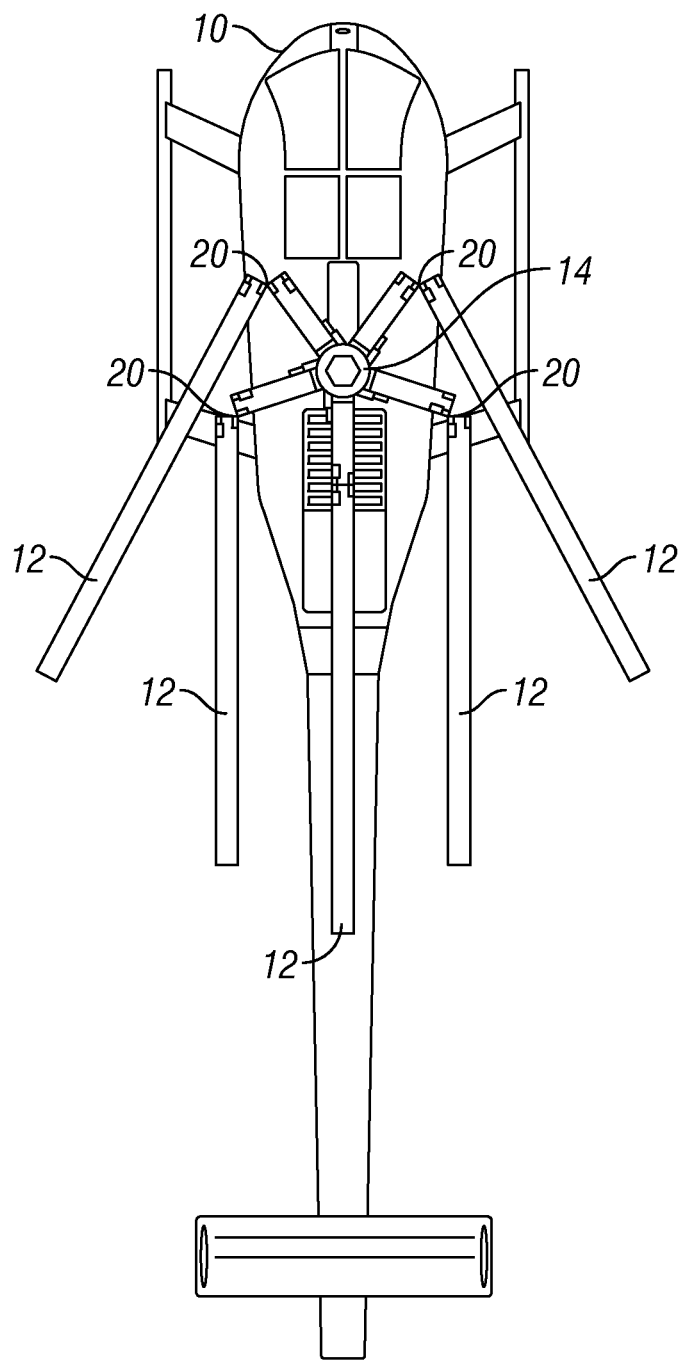
FIG. 3 is a plan view of a rotor for an aircraft in a folded condition.

Shown in FIG. 1 is a view of a rotor 10, for example, a helicopter. The rotor 10 includes a plurality of rotor blades 12 extending from a rotor hub 14. Each blade 12 includes features that allow for folding and unfolding of the blade 12. For example, as shown in FIG. 2, the blades 12 include a pitch lock 16 located at the hub 14. The pitch lock 16 is connected to a pitch lock actuator 18. Further, the blades 12 each include and at least one hinge 20 and hinge lock 22 located along the blade 12 at a desired location. The hinge lock 22 is connected to a hinge lock actuator 26. A majority length of the airfoil of blade 12 is folded about the hinge 20 by a fold actuator 24. The actuators provide the forces necessary to move the all of the various components and when operated in the proper sequence allow the blades 12 to fold into a stowed position as shown in FIG. 3. The system described herein is a hydraulic system including hydraulic pitch lock actuators 18 and hinge lock actuators 26, as well as hydraulic control of the hinge 20. It is to be appreciated, however, that the system may utilize other types of actuators, for example, electric actuators, to control the blade 12 fold and may require additional positioning actuators which move the blades 12 in other planes of motion about or around the hub 14.

Referring again to FIG. 2, the pitch lock actuators 18, hinge lock actuators 26, and fold actuators 24 are connected to a fold control system 28 which controls the sequencing on the actuators 18, 26 and the fold actuator 24 during a blade fold and blade spread operation. Sensors 30 are located at each of the actuators 18, 26 and the fold actuators 24 to monitor the blade fold operation and are in operable communication with the fold control system 28. If, during operation of the blade fold system, a sensor 30 indicates an actuator 18, 26 and/or 24 is operating outside of a predetermined limit, the fold control system 28 takes appropriate action, which may include holding or aborting the blade fold operation or reversing the sequence to return to the starting configuration.

Figure 4:
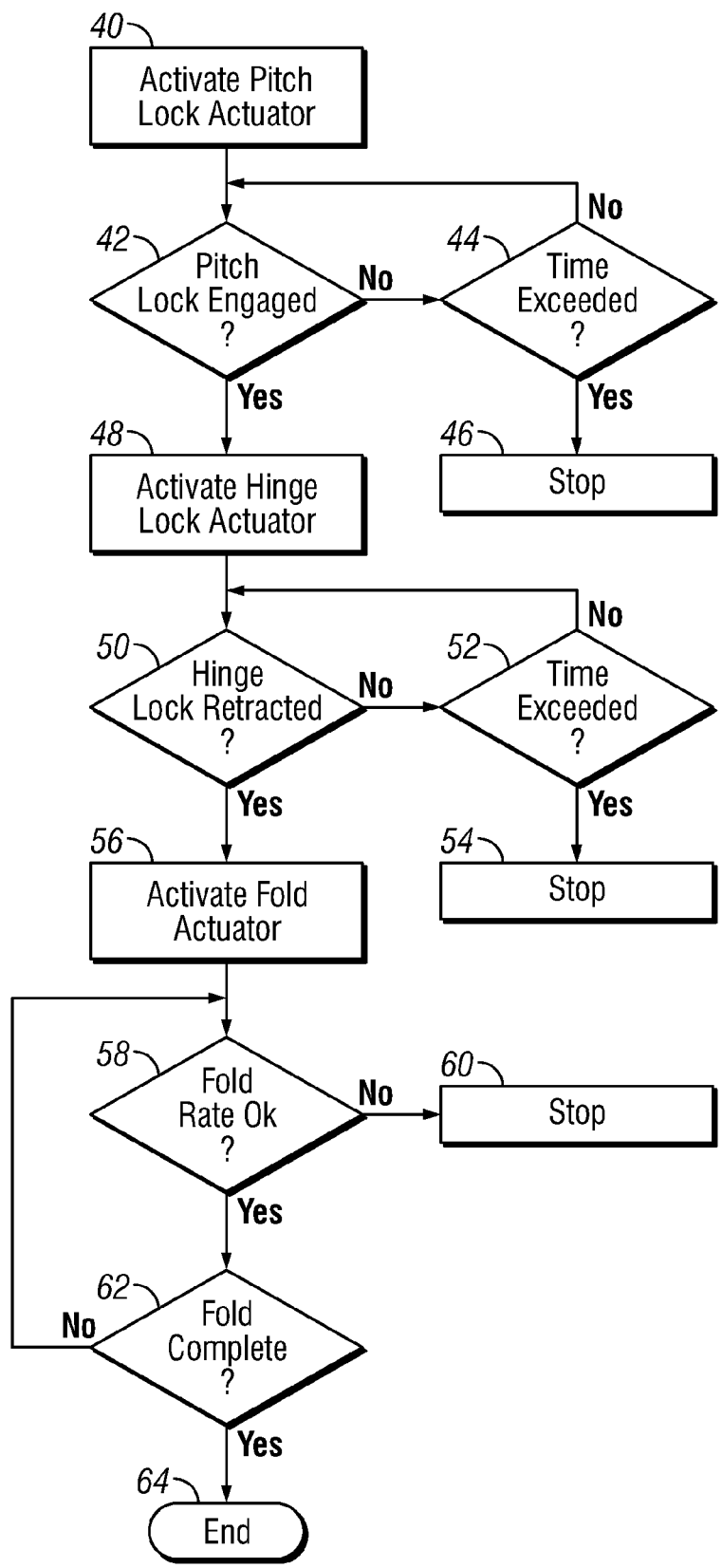
FIG. 4 is a flow diagram of an embodiment of a blade fold system.

FIG. 4 illustrates an example of a blade fold process including a method of fault detection in and control during the blade fold process. The pitch lock actuators 18 are activated in block 40. For example, in a hydraulic system, this may comprise opening a valve to allow hydraulic fluid to the pitch locks 16. A sensor 30 is disposed at each pitch lock 16 to determine if the pitch locks 16 are engaged (block 42), how far along their stroke the pitch locks 16 have advanced, and/or at what rate the pitch locks 16 are advancing to lock the pitch of the blades 12. If the sensors indicate that the pitch locks 16 do not begin to engage, or are not fully engaged within predetermined time limits (block 44), the fold control system 28 may stop all operation of the blade fold system (block 46).

Once the pitch locks 16 are successfully engaged as indicated by the sensors 30, the fold control system 28 energizes the hinge lock actuators 26 to retract the hinge locks 22 thereby allowing the blades 12 to be folded (block 48). The sensors 30 disposed at the hinge locks 22 monitor the hinge lock 22 retraction to determine that the hinge lock 22 retraction is begun within a predetermined time limit 54 and that all of the hinge locks 22 are moving at the correct rate and also retracted within a time limit (block 52). If one of these conditions is not met, the fold control system 28 may take action including slowing or stopping the fold process (block 54). In some embodiments, once all of the hinge locks 22 are fully retracted, the fold control system 28 activates the fold actuator 24 at each hinge 20 to begin fold of the blades 12 in a desired sequence (block 56). The sensors 30 disposed at the hinges 20 monitor progress and rate (block 58) of the folding of each blade 12, especially relative to adjacent blades 12 to prevent collision of adjacent blades 12 during the fold operation. If the progress of folding an adjacent blade 12 is determined to be slower than desired when compared to a predetermined limit and or the progress of the blade 12, the fold control system 28 may slow or stop the fold operation (block 60).

In some embodiments, the folding of a particular blade 12 may begin immediately following retraction of the hinge lock 22 of the blade 12, not necessarily requiring retraction of all of the hinge locks 22 at all of the blades 12. In such embodiments, the sensors 30 monitor progress of retraction of the hinge locks 22 and/or advancement of the hinges 20 of adjacent blades 12 to determine if the adjacent blades 12 are retracting at the desired rate. If the sensors indicate advancement is delayed or stopped unexpectedly, the fold control system 28 may slow or stop the fold operation.

Once the sensors 30 indicate that all blades 12 are fully folded (block 62), the folding operation is stopped by the fold control system 28 (block 64). Utilization of the sensors 30 and the fold control system 28 to monitor and control the fold operation increases the efficiency of the fold operation and increases prevention of collisions of blades 12 during the fold operation due to system faults by early detection of potential faults and immediate, automatic preventative action by the fold control system 28 such as stoppage of the fold operation prior to occurrence of the collision. Use of sensors 30 for monitoring reduces reliance on visual monitoring of the fold process, thereby reducing the potential for human error.

Figure 5:
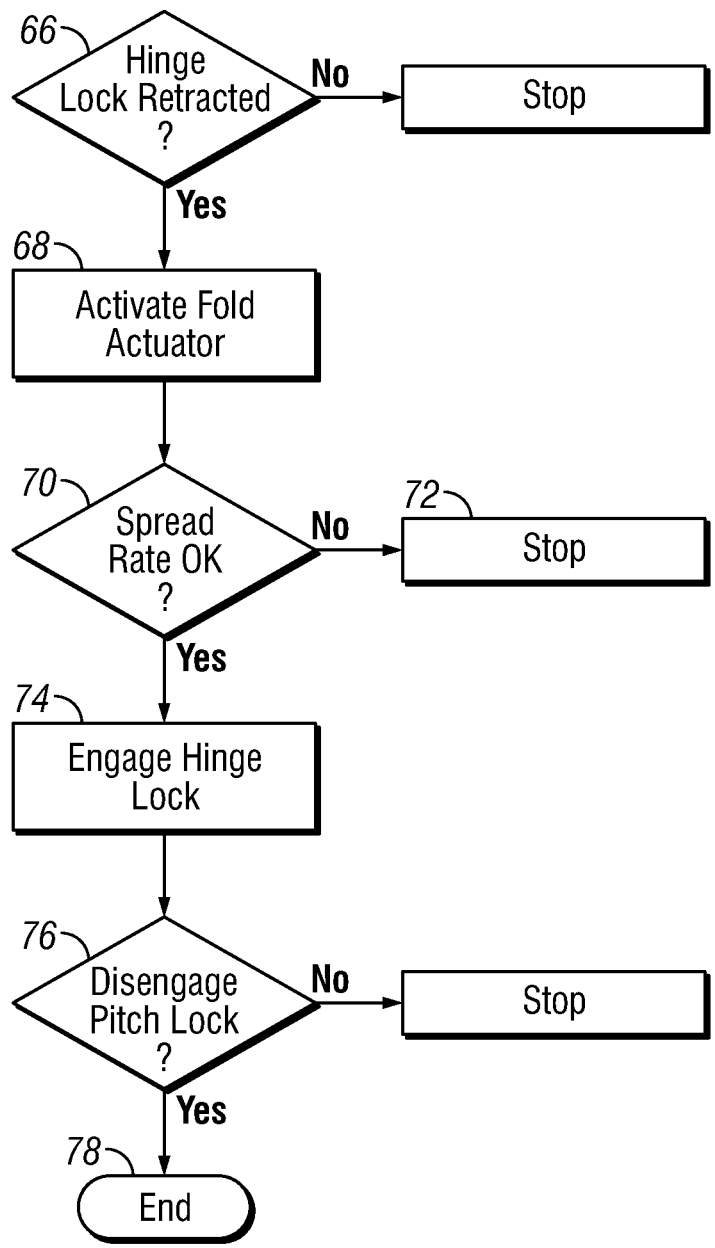
FIG. 5 is a flow diagram of another embodiment of a blade fold system.

Sensors 30 may also be utilized to monitor a blade spread process in which the blades 12 spread from the folded position shown in FIG. 3 to the spread position illustrated in FIG. 1, thus forming a rotary wing. A blade spread process is illustrated in FIG. 5. In block 66, the sensors 30 confirm that the hinge locks 22 are fully retracted so the blade spread may begin without the blades 12 colliding with the hinge lock 22 mechanism. Once retraction of the hinge locks 22 is confirmed, the fold control system 28 activates the fold actuator 24 at each hinge 20 to begin spread of the blades 12 in a desired sequence (block 68). The sensors 30 disposed at the hinges 20 monitor progress and rate (block 70) of the spread of each blade 12, especially relative to adjacent blades 12 to prevent collision of adjacent blades 12 during the fold operation. If the progress of spreading an adjacent blade 12 is determined to be slower than desired when compared to a predetermined limit and or the progress of the blade 12, the fold control system 28 may slow or stop the fold operation (block 72).

When the blades 12 reach their fully spread position, as shown for example, in FIG. 1, the hinge locks 22 are engaged and engagement is confirmed by the sensors (block 74). The pitch locks 16 are retracted (block 76) via the pitch lock actuators 18. The sensors 30 at the pitch locks 16 monitor the pitch lock 16 disengagement, and when disengagement is confirmed by the sensors 30, the blade spread is complete (block 78).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade fold system for an aircraft comprising:
one or more actuators operably connected to one or more blade components of a plurality of rotor blades of the aircraft;
one or more sensors disposed at the plurality of rotor blades configured to sense operation of the one or more blade components; and
a fold control system which is configured to monitor output from the one or more sensors and capable of stopping operation of the blade fold system, via communication with the one or more actuators, if the one or more blade components are not operating within predetermined limits, the fold control system monitoring progress and rate of the folding of a first blade of the plurality of rotor blades and comparing it to a progress and rate of the folding of a second, adjacent blade of the plurality of rotor blades.

2. The blade fold system of claim 1, wherein the one or more blade components include a pitch lock, a hinge lock, a fold hinge and a fold actuator.

3. The blade fold system of claim 2, wherein a first sensor of one or more sensors is disposed at the pitch lock.

4. The blade fold system of claim 3, wherein the first sensor is configured to determine if the pitch lock is engaged and/or position of the actuator along its stroke.

5. The blade fold system of claim 2, wherein a second sensor of the one or more sensors is disposed at the hinge lock.

6. The blade fold system of claim 5, wherein the second sensor is configured to determine if the hinge lock is released.

7. The blade fold system of claim 5, wherein the fold control system compares a release time for the hinge lock to release to a predetermined limit, and is capable of stopping operation of the blade fold system if the release time exceeds the predetermined limit.

8. The blade fold system of claim 2, wherein a third sensor of one or more sensors is disposed at the hinge.

9. The blade fold system of claim 8, wherein the third sensor is configured to determine a rate of movement of the a rotor blade of the plurality of rotor blades at the hinge.

10. The blade fold system of claim 8, wherein the fold control system compares a rate of movement of the rotor blade at the hinge to a predetermined limit, and is capable of stopping operation of the blade fold system if the rate of movement exceeds the predetermined limit.

11. An aircraft comprising:
a rotor including:
    a rotor hub; and
    a plurality of rotor blades extending from the rotor hub; and
a rotor blade fold system as recited in claim 1.

12. A method of folding plurality of rotor blades of an aircraft comprising:
    activating one or more actuators operably connected to the plurality of rotor blades;
    urging the plurality of blades toward a folded position via activation of the one or more actuators;
    monitoring one or more blade components of the plurality of rotor blades via one or more sensors disposed at the plurality of rotor blades;
    determining if the one or more blade components are operating within a predetermined limit;
    stopping operation of the blade fold system if the one or more blade components are not operating within the predetermined limit;
    monitoring progress and rate of the folding of a first blade of the plurality of rotor blades and comparing it to a progress and rate of the folding of a second, adjacent blade of the plurality of rotor blades;
    slowing or stopping the blade fold operation if the progress of the second blade is slower than desired, compared to the progress of the first blade.

13. The method of claim 12, wherein the one or more blade components include a pitch lock, a hinge lock, and/or a hinge.

14. The method of claim 13, further comprising monitoring the pitch lock via a first sensor of one or more sensors.

15. The method of claim 14, further comprising:
    comparing an engagement time for the pitch lock to engage to a predetermined limit; and
    stopping operation of the blade fold system if the engagement time exceeds the predetermined limit.

16. The method of claim 13, further comprising monitoring the hinge lock via a second sensor of the one or more sensors.

17. The method of claim 16, further comprising:
    comparing a release time for the hinge lock to release to a predetermined limit; and
    stopping operation of the blade fold system if the release time exceeds the predetermined limit.

18. The method of claim 13, further comprising monitoring the hinge via a third sensor of the one or more sensors.

19. The method of claim 18, further comprising:
    comparing a rate of movement of the rotor blade at the hinge to a predetermined limit; and
    stopping operation of the blade fold system if the rate of movement exceeds the predetermined limit.

* * * * *